J. T. STODDARD.
WOOD REFUSE INCINERATOR.
APPLICATION FILED AUG. 17, 1917.
Reissued Sept. 24, 1918. 14,524.
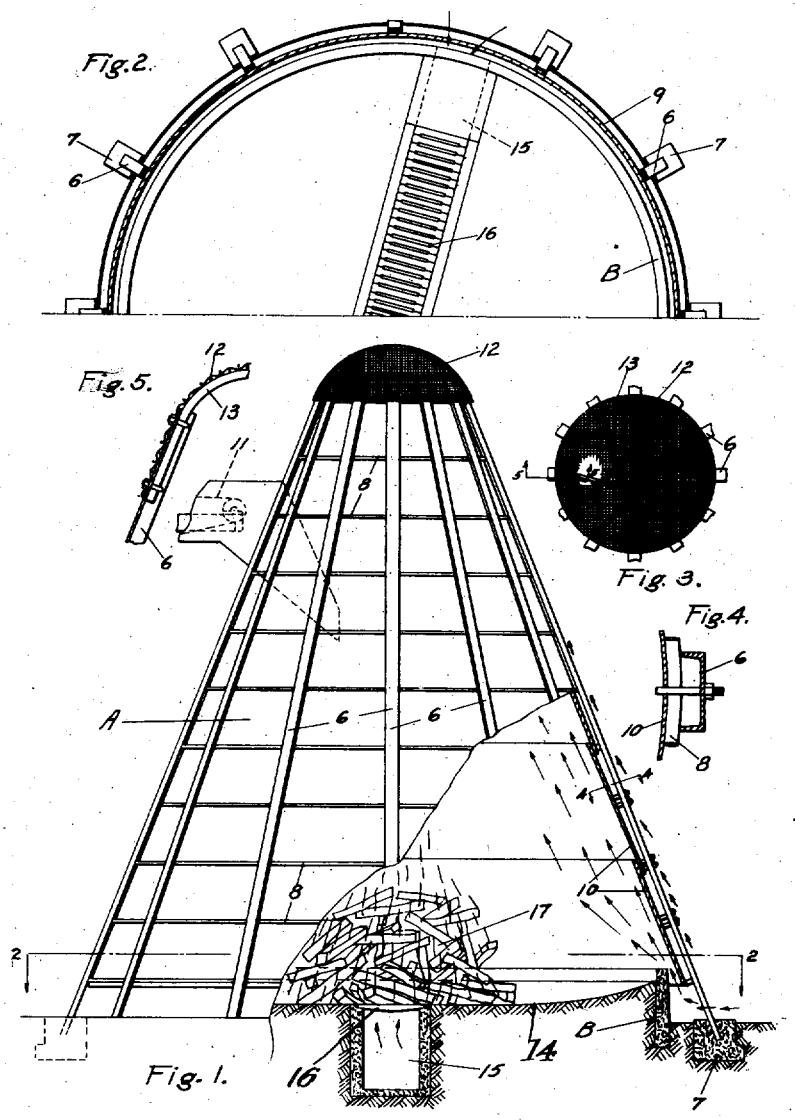
INVENTOR:
James T. Stoddard,
BY
Joseph Schwarz,
ATTORNEY.

UNITED STATES PATENT OFFICE.

JAMES T. STODDARD, OF PORTLAND, OREGON, ASSIGNOR TO AIR COOLED BURNER COMPANY, OF CHEHALIS, WASHINGTON, A CORPORATION OF WASHINGTON.

WOOD-REFUSE INCINERATOR.

14,524. Specification of Reissued Letters Patent. Reissued Sept. 24, 1918.

Original No. 1,171,005, dated February 8, 1916, Serial No. 30,064, filed May 24, 1915. Application for reissue filed August 17, 1917. Serial No. 186,807.

*To all whom it may concern:*

Be it known that I, JAMES T. STODDARD, a citizen of the United States, residing at Portland, in the county of Multnomah and State of Oregon, have invented certain new and useful Improvements in Wood-Refuse Incinerators, of which the following is a specification, reference being had to the accompanying drawing.

My invention relates to that class of devices used to burn the sawdust and other wood-refuse taken from mills or factories engaged in making wood products.

The object of my invention is to provide a device of this kind in which the construction is arranged to produce a supply of cool air upon the inside and outside of its thin metal walls and thus preserve them against destruction from the intense heat developed in burning refuse of that kind, also to secure the best possible draft to the material burned. I attain these objects, as well as other advantages, by the construction, combination and arrangement of parts illustrated in the accompanying drawing, which forms a part hereof.

Figure 1 is a side elevation with parts broken away and showing sectional elevation therein.

Fig. 2 is a transverse half section on the line 2—2 of Fig. 1.

Fig. 3 is a plan view of the top, showing the spark arrester.

Fig. 4 is a cross section of a leg on the line 4—4 of Fig. 1.

Fig. 5 is a longitudinal section of leg on the line 5—5 of Fig. 3, showing the attachment of the spark arrester.

Like letters and numerals refer to like parts throughout the views.

A represents the body of the incinerator. B represents a wall surrounding a hearth 14 that is disposed within the body A. The wall B is disposed preferably within the body A.

The body A is supported, in practice by legs 6, preferably made of channel metal, having their lower ends rigidly secured in footings 7 anchored in the earth. By preferred construction, the body A comprises a series of horizontally disposed hoops 8 secured to the legs 6 and spaced one from another at desired intervals, the said hoops preferably diminishing in diameter as the top of body A is approached, whereby they serve to impart a conical shape to the body. Upon the frame formed by said legs and hoops, and preferably upon the inside thereof, is applied and fixed a wall 9, preferably made of sheet metal divided into horizontal sections 10.

The lower edge or skirt of the wall 9 is supported, as by the legs 6, at a height above the ground level, to provide space for the admission of an ample supply of air all around it.

A conveyer 11 is adapted to make discharge, at a suitable height above ground, of material to be burned into the interior of the body A through the wall 9.

A convenient support for the usual foraminous spark arrester, may be provided in curved rods or arch members 13, spanning the distance, respectively, between legs 6 to which they are united as indicated, for example, in Fig. 3.

The wall B preferably extends a suitable height above the lower end of the body wall 9 and also to allow a suitable space between the two walls laterally.

The hearth 14 is disposed within the body A. It may be defined by the wall B if preferred, but essentially it consists only of a resting place for material to be burned. An ash-pit 15 is preferably provided so as to extend from one side of the body A into the interior thereof underneath the hearth 14. The ash-pit has a fire-grate 16.

Material 17 is shown in position for incineration.

My device should be set up in a suitable location near a refuse material supply place so that the material can be easily conveyed to the incinerator and the danger from conflagration can also be minimized.

A door may be and usually is provided in a convenient position in the body so that the operator can enter the body A to start a fire, also to remove ashes. When the fire is started, sawdust and refuse wood material are sent through the conveyer and deposited on the hearth and the incineration is thereafter carried on indefinitely. A draft enters the middle part of the body A from below through the ash pit, and also there is an abundant draft from the sides to insure speedy and complete incineration of everything deposited.

It will be seen, that owing to the shape of the body, a chimney effect is produced which makes an excellent combustion draft. It will be further seen that the cold air enters from below, and, while supplying all required for combustion, it also follows upward along the interior of the wall. The upper portion of the body being heated, the air of course naturally rises and the cold air flows constantly over the inner surface as shown by the arrows. On the outer surface of the body it will be noted that as each portion becomes heated the air rises therefrom and cold air constantly rushes against all parts of the outer surface as indicated by the arrows. This, and the thin metal in the wall, insure a temperature so low in the body and the legs that they will never fuse or burn out. In any event the life of the body is conserved indefinitely. I prefer to construct the legs of channel iron. The wall being secured on the inside of the frame protects the latter from the heat. The channels in the legs facing inward also assist in the passage of the cooling drafts upward.

The cheapness of construction, positive cooling arrangement, and effective drafts make my device highly successful both as to its management and cost of operation. Its durable quality is also an important feature in cost of maintenance. While the wall B is illustrated as circular, it may also be of polygonal or other suitable form.

The spark arrester is easily secured on a device of this form and perfectly prevents all danger of setting out fires.

What I claim is:

1. An incinerator of the character described, comprising a suitable foundation, a body located over the foundation and having an upwardly extending wall, forming an inclosed combustion chamber, means for supporting said wall with its lower edge elevated above the foundation, and a wall extending upwardly from the foundation and spaced from the lower portion of the body wall sufficiently to permit an indraft of air beneath the body to the interior thereof, said second wall extending above the lower edge of said body.

2. An incinerator of the character described, comprising a suitable foundation, an upright body with openings at each of its ends and open throughout its length, means to support said body at a suitable height over the foundation, and a wall rising from the foundation adjacent to the body on all sides and having its upper edge arranged at a suitable distance laterally from the body to provide for the admission of air and also extending above the lower edge of said body.

3. An incinerator of the character described, comprising a suitable foundation, an upright body with openings at each of its ends and open throughout its length, said body being composed of a frame, and a metal wall on the inside of the frame, means to support the body at a suitable height above the foundation, and a wall rising from the foundation adjacent to the body on all sides and having its upper edge arranged at a suitable distance laterally from the body to provide for the admission of air and also extending above the lower edge of said body.

4. An incinerator of the character described, comprising a suitable foundation, an upright body with openings at each of its ends and open throughout its length, said body being composed of a frame and a metal wall on the inside of the frame, means to support the body at a suitable height above the foundation, a hearth rising from the foundation within the body, a wall adjacent to the body on all sides and having its upper edge around the hearth spaced laterally from the body sufficiently to permit an indraft of air beneath the body and also extending above the lower edge of said body.

5. An incinerator of the character described, consisting of the combination with a support having a substantially horizontal surface, of an upright shell surmounting the same, means for admitting air substantially all around the lower edge of said shell, said shell being open on all sides from bottom to top for the uninterrupted passage of air or other gaseous substances, and having the upper portion of its vertical axis unobstructed, and additional means for supplying air to the support for securing combustion of the material placed thereon, whereby material to be burned when supplied to said surface within the shell and there ignited will generate within the shell and keep in continuous motion an ascending column of gaseous products of combustion having sufficient force to suck in a volume of air sufficient to support the combustion and at the same time to secure an inflow of air around the lower edge of said shell and maintain against the inside of the shell an upward flow of such air sufficient in volume to prevent the overheating of the shell.

6. An incinerator of the character described, comprising a hearth surface on which the refuse to be burned is placed, an upright open ended shell surrounding and extending above the hearth surface, means for supplying air to the hearth surface to secure combustion of the refuse thereon, and additional means for supporting the shell to provide an open space beneath the same on all sides for the free inflow of air into the lower portion of the shell, said shell having an interior unobstructed to the passage of the products of combustion therethrough from bottom to top, and of sufficient cross sectional area to provide for the ascension of the products of combustion from the refuse being burned and also for a blanket of cooling air entering beneath the shell and ascending in contact with the inner face of said shell.

7. An incinerator of the character described, comprising a hearth surface on which the refuse to be burned is placed, an upright open ended tapered shell surrounding and extending above the hearth surface, means for supporting the shell to provide an open space beneath the same on all sides for the free inflow of air into the shell, additional means for supplying air to the hearth surface to secure combustion of the refuse placed thereon, said shell having an interior unobstructed to the passage of the products of combustion therethrough from bottom to top and of sufficient cross sectional area to provide for the ascension of the products of combustion from the burning refuse and additionally for a blanket of cooling air entering beneath the shell and ascending in contact with the inner face thereof, and means for delivering refuse to be burned centrally upon such hearth surface.

In testimony whereof I have hereunto set my hand in the presence of two subscribing witnesses.

JAMES T. STODDARD.

Witnesses:
HOWARD O. ROGERS,
M. NEVILLE.